US005649618A

United States Patent [19]

Tetzloff

[11] Patent Number: 5,649,618

[45] Date of Patent: Jul. 22, 1997

[54] MOTORCYCLE CLAMPING FIXTURE

[75] Inventor: John M. Tetzloff, Edwardsville, Kans.

[73] Assignee: Lico, Inc., Kansas City, Mo.

[21] Appl. No.: 508,667

[22] Filed: Jul. 28, 1995

[51] Int. Cl.[6] .................................................... B65G 47/04

[52] U.S. Cl. .................................... 198/803.3; 198/803.4; 198/687.1

[58] Field of Search .............................. 198/687.1, 803.3, 198/803.4

[56] References Cited

U.S. PATENT DOCUMENTS

| | | | |
|---|---|---|---|
| 619,186 | 2/1899 | Kingsbury . | |
| 3,514,091 | 5/1970 | Johnson et al. . | |
| 3,981,491 | 9/1976 | Snyder . | |
| 4,341,375 | 7/1982 | Romanin . | |
| 4,662,617 | 5/1987 | Ditterline, Jr. et al. . | |
| 5,217,107 | 6/1993 | Ushiki et al. | 198/803.3 |

*Primary Examiner*—Joseph E. Valenza

*Attorney, Agent, or Firm*—Chase & Yakimo

[57] ABSTRACT

Apparatus utilizing a special clamping fixture supports a motorcycle or similar vehicle as it is conveyed along an assembly line. The fixture is secured to an overhead conveyor by a stabilized suspension means that positions the fixture beneath the motorcycle so that it may receive a pair of laterally spaced, lower frame members of the motorcycle frame. The fixture employs a pair of vises located fore and aft relative to the direction of movement of the conveyor, each of which has a pair of jaws with an axis of clamping action extending transversely of the direction of conveyor movement for receiving a corresponding frame member. An operating means which may be actuated from either side of the conveyor opens and closes the two vises in unison to clamp and hold the frame members. In order to accommodate dimensional variations in the spacing between the frame members, one of the vises is free to float horizontally independently of the other vise as the jaws are tightened onto the frame. Initial mounting of the frame in the fixture is facilitated by support blocks that hold the motorcycle in position as the vises are tightened.

11 Claims, 4 Drawing Sheets

MOTORCYCLE CLAMPING FIXTURE

BACKGROUND OF THE INVENTION

This invention relates to improvements in devices used to support a motorcycle frame during initial assembly of the motorcycle at the factory and, in particular, to an apparatus in the nature of a clamping fixture which is secured to a production line conveyor and stably supports a supported motorcycle without interfering with complete assembly of the components on the motorcycle frame.

In the assembly line manufacture of motorcycles, the typical practice at present is to provide an overhead conveyor from which cradle-type carriers are suspended at spaced intervals along the run of the conveyor. Each of the carriers supports the frame of a motorcycle during assembly as the conveyor moves the carrier down the assembly line at a slow speed and the various parts of the motorcycle are assembled to the frame. Stabilization is not provided, however, and thus the frame during assembly is free to swing while technicians are assembling the motorcycle. Furthermore, the carrier interferes with complete assembly of the motorcycle while it is on the conveyor. This requires that the vehicle be removed from the carrier at the end of the assembly line in a partially assembled condition, and creates the inconvenience of a subsequent procedure to install the remaining parts and complete the assembly of the motorcycle unit.

SUMMARY OF THE INVENTION

It is, therefore, the primary object of the present invention to provide an apparatus for supporting a motorcycle or similar vehicle as it is conveyed along an assembly line, wherein the apparatus supports the frame of the motorcycle with sufficient rigidity to resist the forces of the assembly process and allows free access to the frame for assembly of all parts of the motorcycle thereon.

As a corollary to the foregoing object, it is an important aim of this invention to provide such an apparatus which supports the motorcycle frame by clamping engagement with a pair of lower frame members of the frame in order to both rigidly secure the motorcycle on the conveyor and accomplish the necessary support at points on the lower frame which are clear of other components of the motorcycle which will be assembled thereon during the assembly process.

Another important object of the invention is to provide an apparatus as aforesaid employing a pair of vises positioned beneath and secured to an overhead conveyor by a stabilized suspension means, and which are operated in unison to quickly engage and positively hold the frame members and hence the motorcycle during the assembly process as parts are assembled on the frame.

Another important object is to provide an apparatus as aforesaid utilizing a pair of frame-engaging vises and which is further provided with means permitting independent movement of one of the vises relative to the other to accommodate dimensional variations in the spacing between the engaged frame members, whereby to provide such an apparatus which is self-adjusting and particularly suited to continuous, assembly line use.

Still another important object is to provide such a support apparatus in which the two vises thereof are spaced apart and operate simultaneously along generally parallel clamping axes.

Yet another important object is to provide a support apparatus as set forth in the immediately preceding object in which the jaws of one of the vises are freely movable along their clamping axis in response to engagement with the associated frame member independently of opening and closing movement of the jaws, whereby the one vise is free to float to a position centered on the engaged frame member to accommodate dimensional variations in the motorcycle frames.

Other important objects include the provision of a positioning stop for the floating vise and resilient means yieldably biasing such vise toward an initial position in engagement with the stop, support blocks for engagement by the frame members to hold the motorcycle in position during operation of the vises to clamp the frame members therein, fore-and-aft spacing of the two vises with one of the jaw faces being elongated in the direction of movement of the conveyor for providing increased lateral stability to the supported motorcycle, and means for facilitating simultaneous opening and closing of the vises quickly by hand from either side of the conveyor.

Other objects will become apparent as the detailed description proceeds.

DETAILED DESCRIPTION

Figure 1:
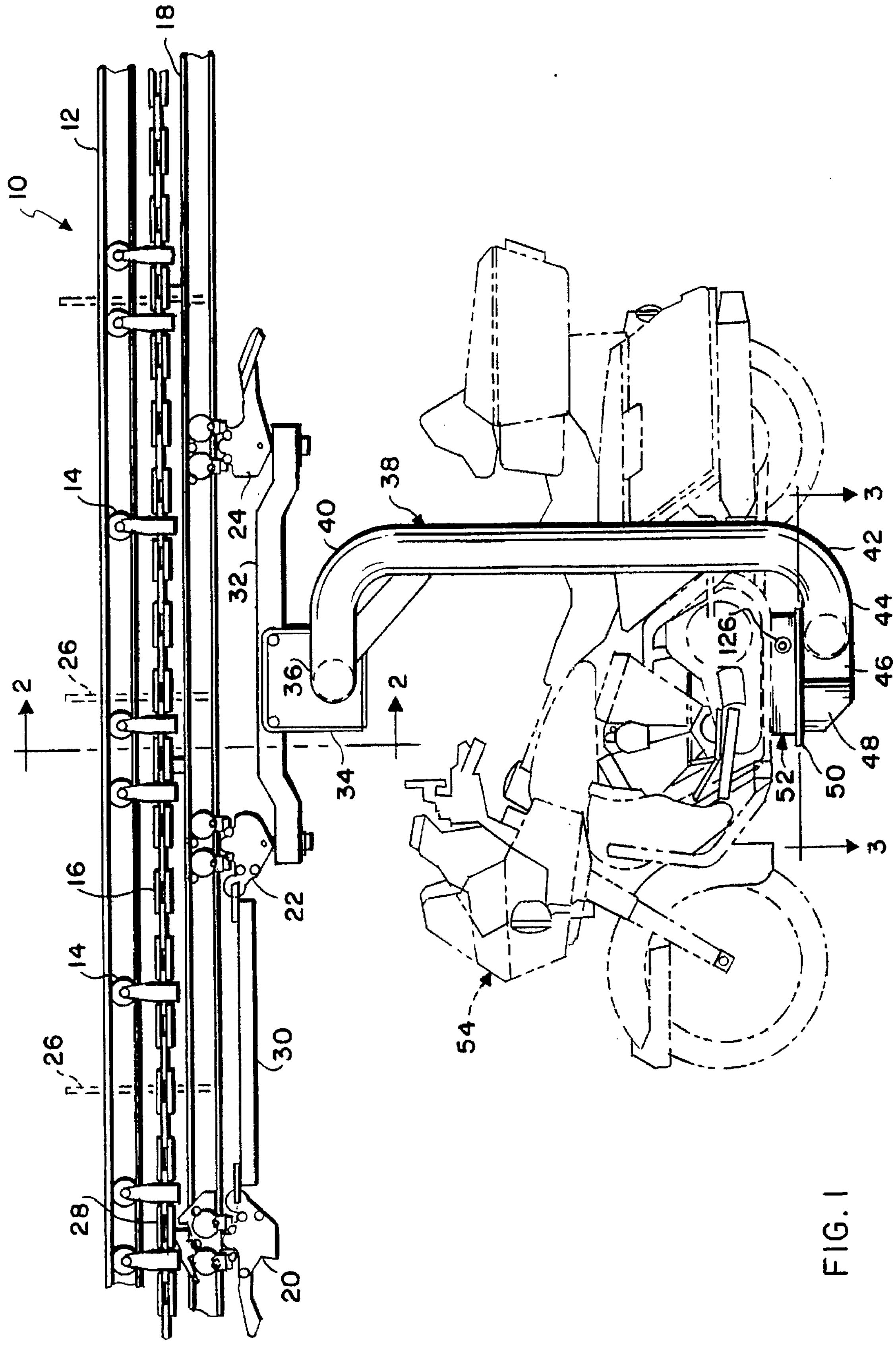
FIG. 1 is a fragmentary, side elevational view of a portion of an assembly line conveyor showing the apparatus of the present invention suspended therefrom and supporting a motorcycle illustrated in phantom lines.
Figure 2:
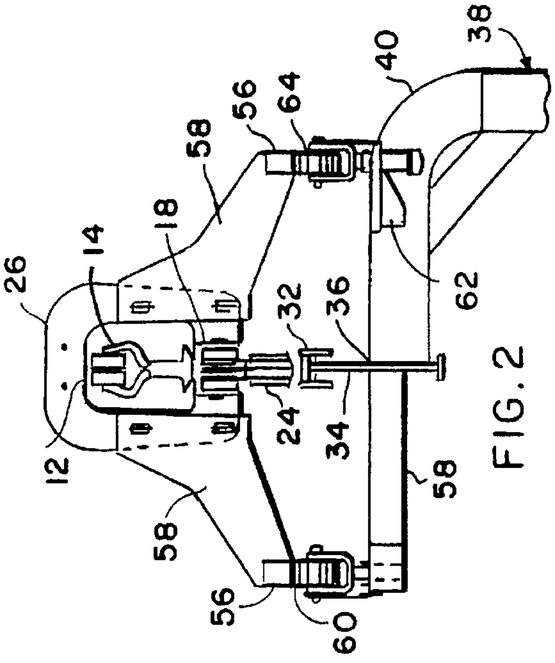
FIG. 2 is a fragmentary, vertical sectional view taken along line 2—2 of FIG. 1 showing the three-rail stabilizing system.
Figure 3:
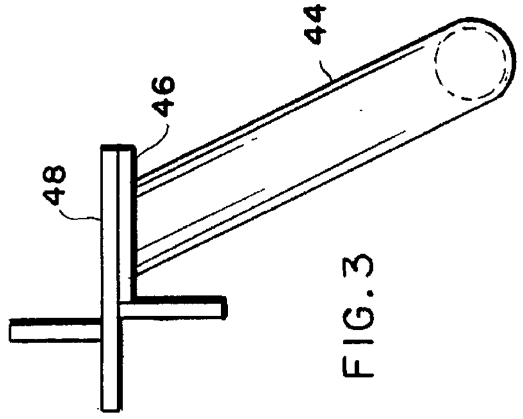
FIG. 3 is a fragmentary, enlarged, plan view looking downwardly and taken substantially along line 3—3 of FIG. 1, and shows the T-bracket that underlies the baseplate of the clamping fixture.

Referring initially to FIGS. 1–3, an overhead trolley conveyor 10 of the power and free type has an I-beam power track 12 which carries a number of trollies 14 that suspend a drive chain 16 below the track 12 in a conventional manner. A free trolley track 18 is spaced below power track 12 and extends parallel thereto, it being understood that the free track 18 typically comprises a pair of opposed channel members (FIG. 2) in which free trollies ride such as illustrated herein at 20, 22 and 24. It will be appreciated that the channel member of track 18 nearest the viewer has been removed in FIG. 1 in order to not obscure the trollies 20–24. Longitudinally spaced yoke plates 26 (shown in broken lines in FIG. 1) suspend the free track 18 below the power track 12 and drive chain 16.

The lead trolley 20 is engaged by a pusher dog 28 depending from the drive chain 16 and thus the conveyor is moving in the direction indicated by the arrow in FIG. 1 (from right to left). A link 30 connects lead trolley 20 to intermediate trolley 22 which, along with the trailing trolley 24, supports the respective ends of a load bar 32. A generally square, vertically oriented mounting plate 34 is rigidly affixed to the load bar 32 between the parallel bar members thereof, and presents a laterally facing surface to which the upper end 36 of a C-shaped hook 38 is welded. The upper end portion of the hook 38 extends horizontally away from the longitudinal axis (direction of movement) of the conveyor 10 at an angle of approximately 45 degrees before the hook 38 turns vertically downwardly at bend 40. A like bend 42 at the lower end of the hook 38 turns the lower end portion 44 inwardly to the vertical plane of the conveyor 10 where the end portion 44 terminates at an end plate 46 which is bolted or otherwise affixed to a T-bracket 48.

Figure 4:
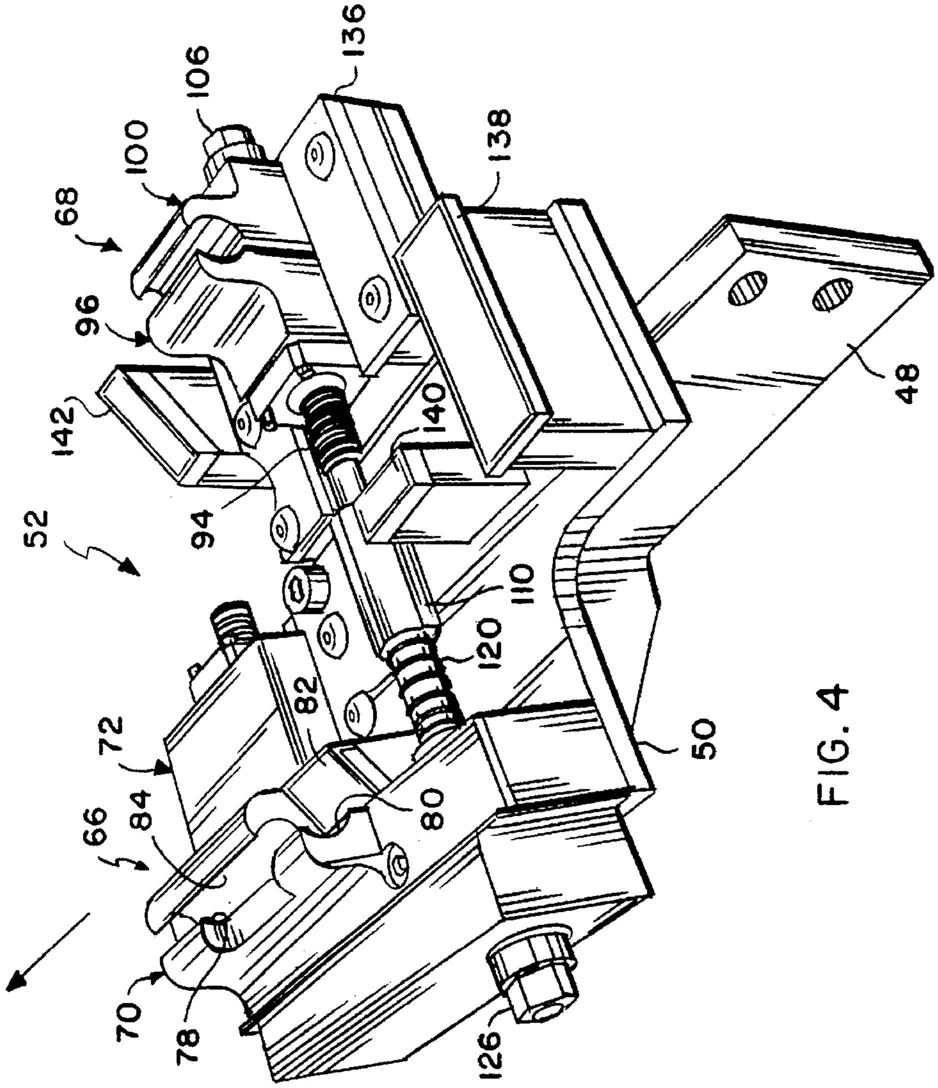
FIG. 4 is a perspective view of the fixture and supporting T-bracket removed from the conveyor and looking generally in the direction of movement of the conveyor.

A horizontal baseplate 50 is mounted on T-bracket 48 (FIG. 4) and supports the components of a clamping fixture 52 of the present invention as will be discussed in detail. A motorcycle 54 under assembly is illustrated in phantom lines in FIG. 1 (shown in an assembled condition) supported by the fixture 52 directly beneath the conveyor 10. The suspension hook 38 is stabilized by a three-rail stabilizing system best shown in FIG. 2 comprising the free rail 24 and a pair of parallel side rails 56 carried by a pair of opposed wings 58 secured to and extending laterally outwardly from the respective legs of the yoke 26. It should be understood that, as is conventional in power-and-free conveyors, each of the yoke plates 26 extends over the top of and is attached to the power track 12, the two depending legs thereof being attached at their lower ends to the exterior faces of the respective channel members of the free track 18.

A horizontal bar 58 extends to the left (as viewed in FIG. 2) from the central mounting plate 34 and carries a roller 60 at its outer end which is in rolling contact with the side rail 56 thereabove. Similarly, the horizontal upper portion of hook 38 has a bracket 62 thereon which mounts a roller 64 in rolling contact with the other side rail 56. Accordingly, three-point stabilization is provided to prevent side-to-side swinging of the motorcycle 54 during assembly. As is typically employed in three-rail stabilizing systems of this general type, a counter weight (not shown) may be attached to bar 58 adjacent its outer end to offset the weight of the hook 38 which is preferably constructed of steel pipe in order to support heavy motorcycles such as an 850-pound road bike. In FIG. 1 the yoke plates 26 are shown in broken lines and the side rails 56, wings 58, rollers 60 and 64 and associate components are removed for clarity.

Figure 5:
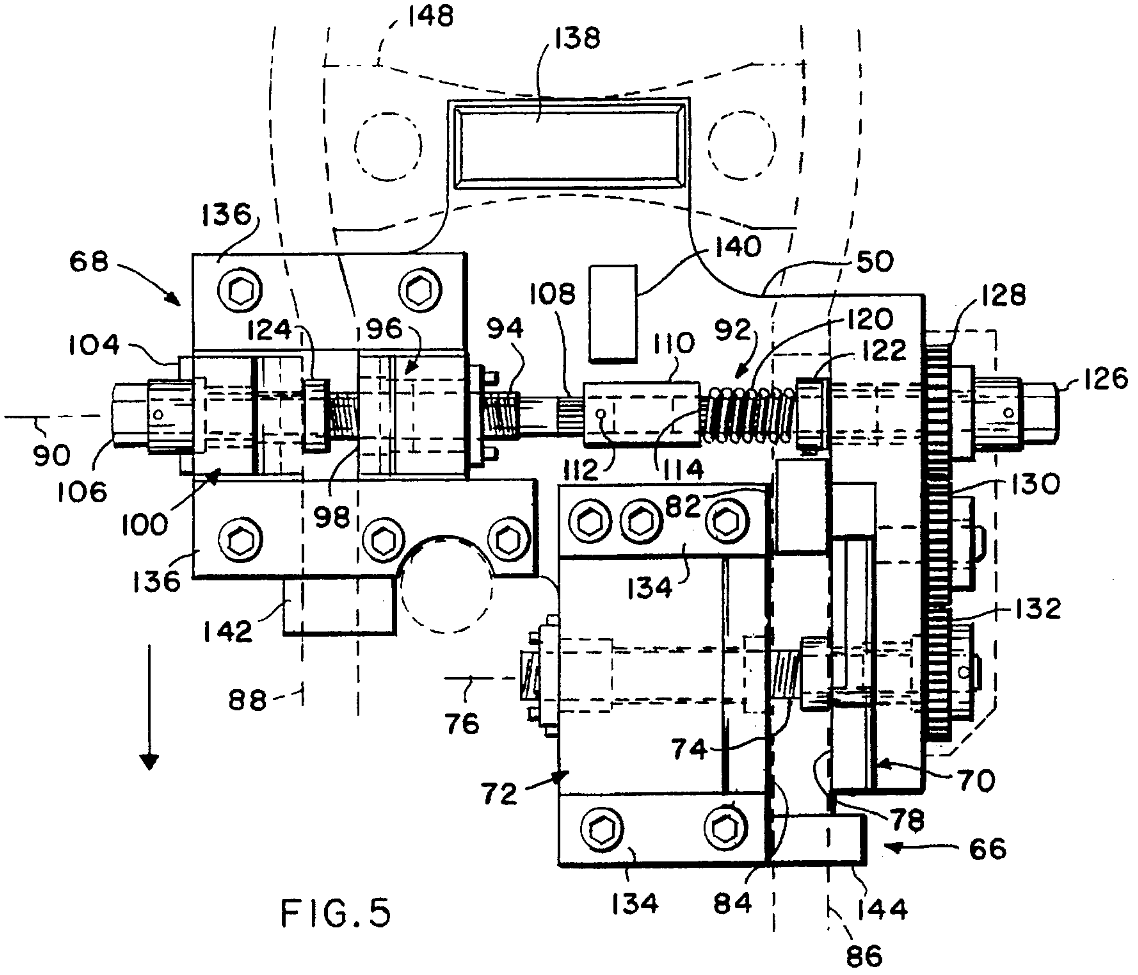
FIG. 5 is a plan view of the fixture seen in FIG. 4 with the underlying T-bracket removed and with the engaged frame members shown in phantom lines.
Figure 6:
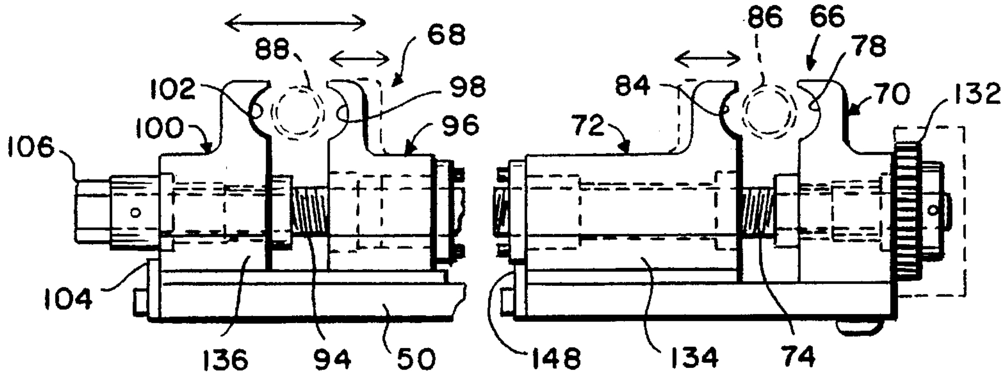
FIG. 6 is a fragmentary, front view of the fixture shown in FIG. 5.

The fixture 52 includes a front vise 66 and a rear rise 68 mounted on baseplate 50 and spaced laterally as well as fore and aft as illustrated by the arrow in FIG. 5 representing the direction of movement of the conveyor 10. Front vise 66 has a fixed jaw 70 and a movable jaw piece 72 which, upon rotation of a screw element 72 threaded therein, moves toward or away from fixed jaw 70 along a clamping axis 76 defined by the screw element 74. Fixed jaw 70 has a longitudinally split jaw face 78, 80 of greater length than the other jaw faces to be discussed, it being noted that the front face 78 is longer than the rear face 80 and that face 80 is spaced rearwardly of movable jaw piece 72 and opposes a support block 82. The jaw piece 72 presents a continuous jaw face 84, it being appreciated from viewing FIGS. 4 and 6 that the jaw faces 78, 80 and 84 are generally semicircular in transverse configuration in order to mate with a tubular frame member 86 of the motorcycle frame illustrated in phantom lines in FIGS. 5 and 6. Both frame member 86 and a second, tubular frame member 88 are two lower frame members of the motorcycle frame that are engaged and held by the fixture 52 entirely from beneath the motorcycle 54, as will become apparent.

The rear vise 68 operates along a clamping axis 90 spaced from and parallel to axis 76, and defined by a shaft assembly 92 that includes a screw component 94 that is threadably received by an inner jaw piece 96 presenting one of the jaw faces 98 of rear vise 68. Upon rotation of the screw component 94, jaw piece 98 moves toward or away from an outer jaw piece 100 that presents a jaw face 102. As is particularly apparent from FIG. 6, the opposed jaw faces 98 and 102 of the rear vise 68 are likewise configured to complementally receive and engage the motorcycle frame member 88 illustrated in phantom lines. As shown, the outer jaw piece 100 has an initial position in engagement with a positioning stop 104 projecting upwardly from the left edge of baseplate 50.

Figure 7:
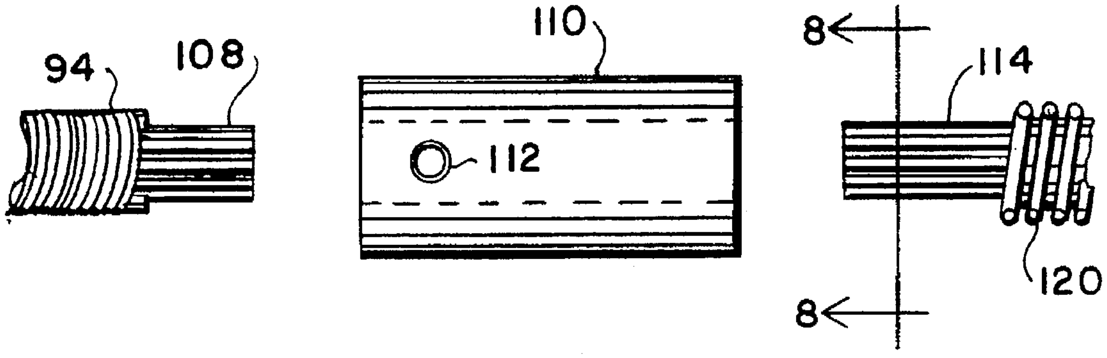
FIG. 7 is an enlarged, exploded detail showing the spline coupling and associated components.
Figure 8:
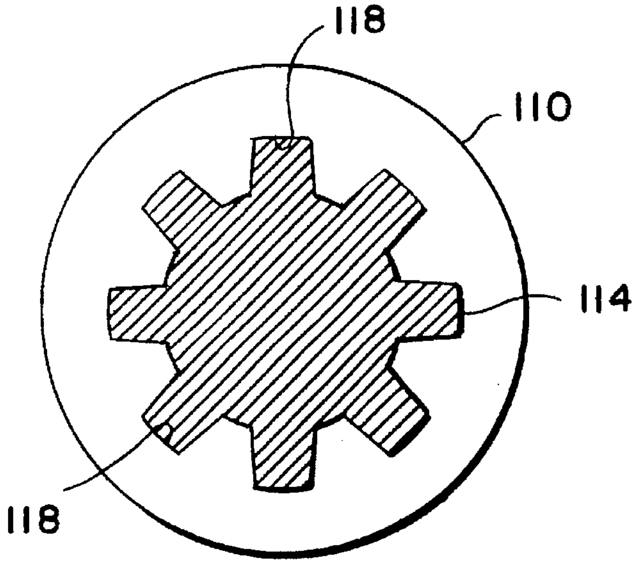
FIG. 8 is a greatly enlarged, cross-sectional view taken along line 8—8 of FIG. 7.

The screw component 94 terminates in an outer end 106 provided with flats for the purpose of receiving a wrench so that the shaft assembly 92 may be readily turned by hand from the right side of the conveyor 10 looking in the direction of travel thereof. The screw component 94 terminates in a splined inner end portion 108 received within a coaxial sleeve coupling 110 and rigidly secured therein by a roll pin 112 (FIG. 7). The opposite end of coupling 110 receives the splined inner end portion of a shaft section 114 that mates with eight regularly spaced internal grooves 118 in the sleeve 110 (FIG. 8), thereby providing a spline coupling between the screw component 94 and the shaft section 114 of shaft assembly 92. A return spring 120 on shaft section 114 is compressed between coupling 110 and a collar 122 to bias the coupling 110, screw component 94 and vise 68 to the left along axis 90 as viewed in FIG. 5 toward the initial position thereof at which the outer jaw piece 100 is against the stop 104. It should be noted that screw component 94 turns within an unthreaded bore in jaw piece 100, and a collar 124 precludes axial movement of the outer jaw 100 except as permitted by relative axial movement of shaft section 114 within the mating bore of coupling 110. Accordingly, the coupling 110 permits movement of jaws 96 and 100 along axis 90 independently of rotation of the screw component 94 and, as will be appreciated, independently of the operation of the front vise 66 to permit the rear vise 68 to float horizontally as the jaws 96, 100 are tightened against frame member 88.

More particularly, it may be seen that the right end 126 of shaft assembly 92 (as viewed in FIG. 5) is also provided with flats so that the shaft may be rotated by applying a wrench thereto from the left side of the conveyor seen in FIG. 1. A drive gear 128 on shaft section 114 adjacent end 126 is in mesh with an intermediate gear 130 that, in turn, engages a driven gear 132 on the outer end of screw element 74 to provide a gear drive interconnecting vises 66 and 68 for operation in unison as shaft assembly 92 is rotated. Screw component 94 employs a right-hand thread whereas screw element 74 has a left-hand thread so that the two vises open and close simultaneously. A pair of parallel guide bars 134 secured to baseplate 50 define a track for sliding movement of movable jaw piece 72 along axis 76, and a pair of guide bars 136 likewise define a track for movement of jaw pieces 96 and 100 along axis 90.

In use, the jaws of the front and rear vises 66 and 68 are opened by application of a wrench to either end 106 or 126 of shaft assembly 92 and a motorcycle frame is placed on the fixture 52 with the two lower frame members 86 and 88 received within the open jaws of the respective vises. Five support blocks on the base plate 50 assist in holding the frame in position while the jaws are then closed, and comprise an aft support block 138, a supplemental support block 140 in front of block 138, a support block 142 in front of the rear vise 68, and fore-and-aft support blocks 144 and 82 adjacent the respective ends of the movable jaw face 84 of the front vise 66. As may be seen in FIG. 4, the support blocks 142 and 82 present inclined upper surfaces to further assist in initially holding the frame in the open jaws. The aft support block 138 is advantageously located, in the instant example, just beneath a butterfly cross bar 148 bridging the two motorcycle frame members 86 and 88.

As shaft assembly 92 is rotated by application of a wrench to either end 106 or 126 thereof, the jaws of the two vises close in unison about the frame members 86 and 88. Remembering that the rear vise 68 is free to float if necessary to accommodate dimensional variations in the spacing between members 86 and 88, attention is directed to the situation depicted in FIG. 6 by the spacing between the members 86 and 88 shown. Outer jaw 70 of vise 66 is fixed to the baseplate 50. Accordingly, once vise 66 is fully closed, the movable jaw 72 will have moved to the right from the full line position seen in FIG. 6 to clamp member 86 between the jaw faces 78 and 84. Frame member 88 will likewise have moved to the right and be in engagement with the face 98 of movable jaw 96 of the rear vise 68. This will force jaw 100 to shift to the right along axis 90 (as viewed in FIGS. 5 and 6) as screw component 94 continues to turn. The end result is that the entire vise 68 will move to the right so that its jaw faces 98 and 102 will accommodate the position of frame member 88 which is dictated by its spacing from member 86. Therefore, when fully closed, the outer jaw piece 100 of rear vise 68 will be spaced from the positioning stop 104.

The closed jaws provided by the vises 66 and 68 of fixture 52 securely hold the motorcycle 54 against movement under the forces of the assembly process. The elongated jaw face 78 of the fixed jaw 70 provides additional surface contact with the frame member 86 in order to increase lateral stability.

At the end of the assembly line, the operator may quickly release the fixture 52 from either side of the conveyor 10 by applying a wrench to either shaft end 106 or 126. As the jaws open to unclamp the frame, the compressed spring 120 returns the rear vise 68 to its initial position with jaw piece 100 engaging stop 104. The full open position of front vise 66 is limited by a stop 148.

Being entirely beneath the motorcycle 54 and clamped only to the two lower frame members 86 and 88, it may be appreciated that the fixture 52 of the present invention does not interfere with the installation of the motorcycle components on the frame during the assembly line process. Although only one motorcycle 54, fixture 52 and associated suspension are illustrated herein, it should be understood that the conveyor 10 would include a number of trolley trains on free track 18 provided with suspended clamping fixtures 52 supporting successive motorcycles in various stages of assembly.

Having thus described the invention, what is claimed as new and desired to be secured by Letters Patent is as follows:

1. Apparatus for supporting a motorcycle during assembly thereof, the motorcycle having a pair of laterally spaced, lower frame members, said apparatus comprising:

a base adapted to underlie the motorcycle and having means for securing the base to a conveyor for movement in a predetermined direction, a pair of spaced apart vises on said base adapted to receive corresponding frame members, means connected to said vises for operating the same in unison to clamp each frame member in the corresponding vise, and one of said vises having a pair of jaws and means permitting free movement of said jaws laterally of said direction in response to engagement with the associated frame member to accommodate dimensional variations in the spacing between the frame members, whereby the frame members are rigidly held by the vises to resist the forces thereon during assembly of the motorcycle.

2. The apparatus as claimed in claim 1, wherein said pair of vises are located on said base fore and aft relative to said direction, said one vise including rotatable shaft means having a screw component engaging one of said jaws thereof and defining a laterally extending first axis for movement of said jaws between open and closed positions, and wherein the other of said vises has first and second jaws and a rotatable screw element engaging said first jaw for moving it between open and closed positions relative to the second jaw along a second axis extending generally parallel to said first axis, said means for operating the vises including drive means interconnecting said shaft means of the one vise and said screw element of the other vise for rotating the same simultaneously.

3. The apparatus as claimed in claim 2, wherein said base has opposite sides spaced transversely of said direction, and said shaft means presents a pair of opposed ends at corresponding sides of said base, there being means on each of said ends for facilitating rotation of the shaft means by hand, whereby the vises may be operated from either side of the conveyor.

4. The apparatus as claimed in claim 1, wherein said one vise includes rotatable shaft means having a screw component engaging one of said jaws thereof and defining a laterally extending axis for movement of said jaws between open and closed positions, said shaft means further having a coupling therein provided with means permitting movement of both jaws of said one vise along said axis independently of rotation of the screw component, whereby to provide said means permitting free movement of the jaws in response to engagement with the associated frame member.

5. The apparatus as claimed in claim 4, wherein said pair of vises are located on said base fore and aft relative to said direction, and the other of said vises has first and second jaws and a rotatable screw element engaging said first jaw for moving it between open and closed positions relative to the second jaw along an axis extending generally parallel to said axis of the screw component, and wherein said means for operating the vises includes drive means interconnecting said shaft means of the one vise and said screw element of the other vise for rotating the same simultaneously.

6. The apparatus as claimed in claim 4, further comprising a positioning stop on said base engageable by said one vise, said coupling being provided with resilient means yieldably biasing said one vise toward an initial position in engagement with said stop prior to operation of the vises to clamp the frame members between the jaws thereof.

7. The apparatus as claimed in claim 1, further comprising support blocks on said base adapted for engagement by said frame members to hold the motorcycle in position during operation of said vises to clamp the frame members therein.

8. Apparatus for supporting a motorcycle during assembly thereof, the motorcycle having a pair of laterally spaced, lower frame members, said apparatus comprising:

a base adapted to underlie the motorcycle and having means for suspending the base from an overhead conveyor for movement in a predetermined direction, a pair of spaced apart vises on said base and each having a pair of jaws with an axis of clamping action extending transversely of said direction for receiving a corresponding frame member therebetween, means connected to said vises for operating the same in unison to clamp each frame member in the corresponding vise, and one of said vises having means permitting free movement of the jaws thereof along its clamping axis independently of the other vise in response to engagement with the associated frame member to accommodate dimensional variations in the spacing between the frame members, whereby the frame members are rigidly held by the vises to resist the forces thereon during assembly of the motorcycle.

9. The apparatus as claimed in claim 8, wherein said suspending means includes stabilizing means for preventing swinging of the base and vises beneath the conveyor.

10. The apparatus as claimed in claim 8, wherein one of the jaws of said other vise is fixed on said base and has an elongated jaw face extending in said direction for providing substantially greater surface contact with the associated frame member than the other jaws of the vises, whereby to provide increased lateral stability to the supported motorcycle.

11. The apparatus as claimed in claim 8, wherein said pair of vises are located on said base fore and aft relative to said direction.

* * * * *